(12) United States Patent
Feil, III et al.

(10) Patent No.: US 8,745,944 B1
(45) Date of Patent: Jun. 10, 2014

(54) FIRESTOPPING APPARATUS WITH AIRFLOW-BLOCKING ELEMENTS

(71) Applicant: 3M Innovative Properties Company, St. Paul, MN (US)

(72) Inventors: William J. Feil, III, Woodbury, MN (US); Andrew H. Tilstra, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/827,714

(22) Filed: Mar. 14, 2013

(51) Int. Cl.
*E04B 1/94* (2006.01)

(52) U.S. Cl.
USPC .............................. 52/317; 52/232

(58) Field of Classification Search
USPC ............................ 52/323, 220.8, 317; 169/48
See application file for complete search history.

(56) References Cited

U.S. PATENT DOCUMENTS

| | | | | |
|---|---|---|---|---|
| 3,678,634 A * | 7/1972 | Wise et al. | ............................ | 52/1 |
| 4,136,707 A | 1/1979 | Gaillot | | |
| 4,559,745 A * | 12/1985 | Wexler | ................................ | 52/1 |
| 5,301,475 A * | 4/1994 | Stefely | ................................. | 52/1 |
| 5,421,127 A * | 6/1995 | Stefely | ................................. | 52/1 |
| 5,548,934 A | 8/1996 | Israelson | | |
| 6,928,777 B2 | 8/2005 | Cordts | | |
| 7,114,303 B2 | 10/2006 | Cordts | | |
| 7,523,590 B2 * | 4/2009 | Stahl, Sr. | ........................ | 52/232 |
| 8,069,623 B2 | 12/2011 | Colwell et al. | | |
| RE43,997 E * | 2/2013 | Stahl, Sr. | ..................... | 52/406.1 |
| RE44,033 E * | 3/2013 | Stahl, Sr. | ..................... | 52/406.1 |
| 2004/0016193 A1 * | 1/2004 | Stahl, Sr. | ......................... | 52/317 |
| 2006/0138251 A1 * | 6/2006 | Stahl, Sr. | ...................... | 239/309 |
| 2010/0326678 A1 | 12/2010 | Monden | | |
| 2011/0094759 A1 * | 4/2011 | Lopes | ............................ | 169/48 |
| 2012/0036801 A1 | 2/2012 | Colwell | | |

OTHER PUBLICATIONS

U.S. Appl. No. 13/826,591, entitled "Firestopping Apparatus with Airflow-Blocking Elements," filed Mar. 14, 2013.

* cited by examiner

*Primary Examiner* — Brian Glessner
*Assistant Examiner* — Paola Agudelo
(74) *Attorney, Agent, or Firm* — Kenneth B. Wood (57) ABSTRACT

A firestopping apparatus including a sleeve with at least one pair of airflow-blocking elements, at least one element of which is movable towards, and away from, the other element.

22 Claims, 7 Drawing Sheets

FIRESTOPPING APPARATUS WITH AIRFLOW-BLOCKING ELEMENTS

BACKGROUND

Elongate tubes and the like are often passed through openings that penetrate e.g. through the interior walls of buildings. In the process of firestopping such through-penetrating openings, it is common practice to place the tube or tubes in a sleeve and to provide a firestop material, e.g., an intumescent material, within the sleeve.

SUMMARY

In broad summary, herein is disclosed a firestopping apparatus comprising a sleeve with at least first and second airflow-blocking elements, with at least one of the elements comprising a resiliently compressible material, being movable towards and away from the other element, and being biased toward the other element. These and other aspects of the invention will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate similar or like elements, and/or concepts that are common to multiple figures. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", "bottom", "upper", "lower", "under", "over", "front", "back", "outward", "inward", "up" and "down", and "first" and "second" may be used in this disclosure, it should be understood that those terms are used in their relative sense only unless otherwise noted. As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, completely, strictly, and the like, are understood to be within the usual tolerances or measuring error applicable to the particular circumstance rather than requiring absolute precision or a perfect match.

DETAILED DESCRIPTION

Figure 1:
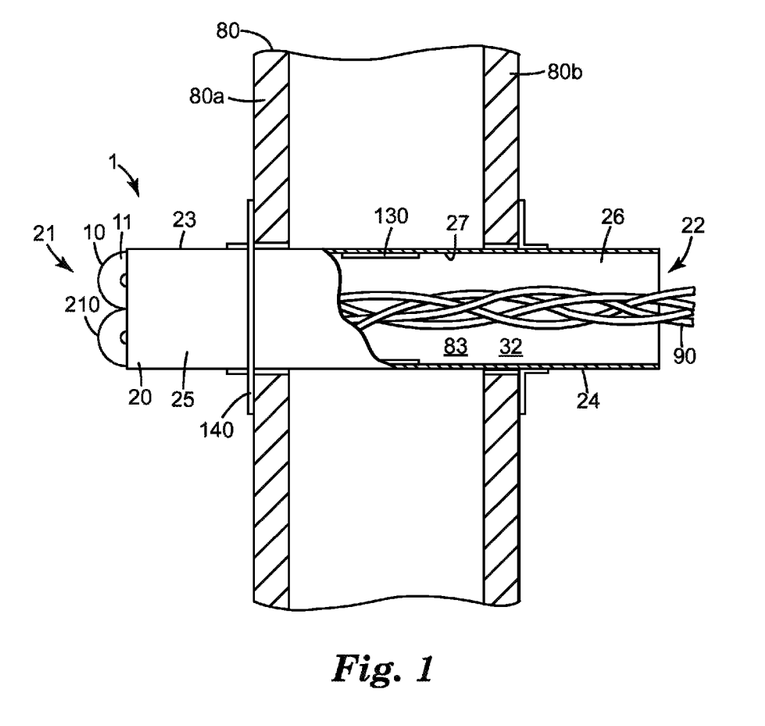
FIG. 1 is a side schematic view in partial cutaway of an exemplary firestopping apparatus, mounted in a through-penetrating opening in a wall.

Shown in FIG. 1 in side schematic view in partial cutaway is an exemplary firestopping apparatus 1 that may be useful in the firestopping of a through-penetrating opening 83, e.g., in a wall of a building. In the present context, the term wall is used broadly to include vertical walls as well as horizontal floors/ceilings, etc. While the particular wall 80 shown in FIG. 1 comprises two partitions 80a and 80b, separated from each other by a cavity space established e.g. by a stud (in which case opening 83 would comprise aligned openings in partitions 80a and 80b respectively), wall 80 may comprise a single partition and may or may not comprise features such as studs etc. Wall 80 and/or partitions thereof may be comprised of commonly known building materials such as gypsum, wood, plaster, concrete, and the like.

Apparatus 1 comprises an elongated, open-ended sleeve 20 that defines interior space 32 therewithin, and that comprises a long axis that may be conveniently aligned with the direction that through-penetrating opening 83 extends through wall 80. Interior space 32 of sleeve 20 is configured so that at least one elongate tube 90 may be passed therethrough (with several elongate tubes 90 being shown passed partially through space 32 of sleeve 20 in FIG. 1). In some embodiments, sleeve 20 may comprise at least one piece of firestop material 130 as depicted in exemplary manner in FIG. 1. In specific embodiments, such a piece of firestop material 130 may be provided e.g. as a sheetlike slab or pad that is positioned along a major inside surface 27 of sleeve 20. In some embodiments, such a piece of firestop material may comprise an intumescent composition so that if activated (e.g. by heat) the firestop material may expand so as to partially or completely block the passage of flame, hot gases, smoke, etc. through sleeve 20. In further embodiments, a second piece of firestop material may be provided e.g. on a generally oppositely-facing inner wall from the first piece, so that one or more elongate tubes can pass therebetween and so that if activated and expanded, the two firestop pieces may expand e.g. generally towards each other. However, it will be appreciated that such firestop material, if present, can be provided at any suitable location within sleeve 20, and in any suitable form, geometry, and number of pieces. If desired, one or more cover plates 140 can optionally be provided as shown in exemplary embodiment in FIG. 1. Such an arrangement may e.g. enhance the securing of sleeve 20 to wall 80 and/or minimize the chance of any airflow pathway being present around the exterior of sleeve 20. (Caulk, putty or any other suitable space-filling material may also be placed around the exterior of sleeve 20, if desired.)

Sleeve 20 comprises first and second open ends 21 and 22 as shown in FIG. 1 (it being understood that the term open-ended applies to sleeve 20 itself, irrespective of the fact that airflow through sleeve 20 may be at least partially blocked at times by airflow-blocking elements as described herein).

Apparatus 1 further comprises first and second airflow-blocking elements 10 and 210, as shown in representative example in FIG. 1. These airflow-blocking elements may serve to partially or completely block the passage of air, hot gases, smoke, etc. through sleeve 20, prior to the activation of a firestop material (if present) of sleeve 20. That is, such elements may minimize the chance of any hot gases or smoke arising from a fire from penetrating through sleeve 20 prior to the time that the heat generated from the fire is sufficient to activate the firestop material.

Figure 2:
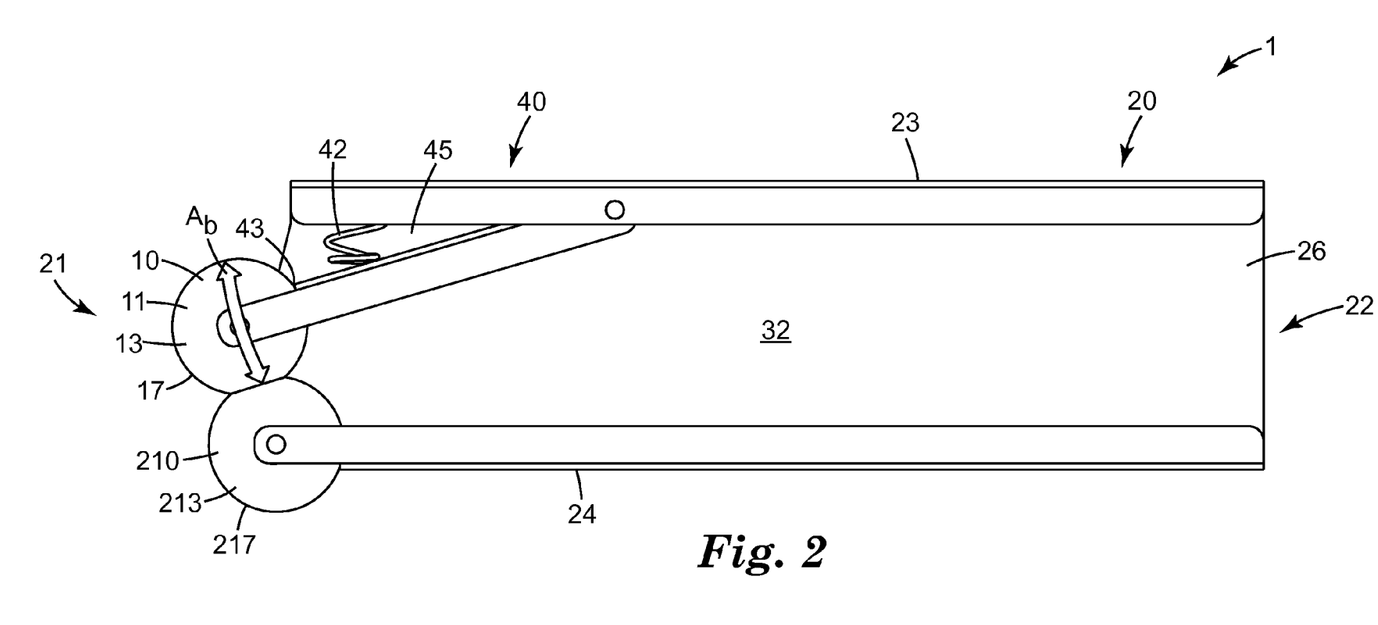
FIG. 2 is a side plan view in cutaway of an exemplary firestopping apparatus.

First and second airflow-blocking elements 10 and 210 may be positioned proximate first open end 21 of sleeve 20 (e.g., so that they will not interfere with any expansion of firestop material 130). At least first airflow-blocking element 10 is movable toward, and away from, second airflow-blocking element 210, and is biased toward second airflow-blocking element 210. With reference to the exemplary illustration of FIG. 2, first airflow-blocking element 10 may be supported by (and connected to sleeve 20 by) a biasing suspension 40 that biases first airflow-blocking element 10 toward second airflow-blocking element 210 along a biasing axis (e.g., pathway, indicated by arrow $A_b$ in FIG. 2), along which axis first airflow-blocking element 10 is movable toward, and away from, second airflow-blocking element 210. In at least some embodiments, biasing axis $A_b$ may be at least generally orthogonal to the long axis of elongated sleeve 20; in particular embodiments, biasing axis $A_b$ may be arcuate as shown in FIG. 2. In some embodiments, at least a portion of first airflow-blocking element 10 protrudes outward along the long axis of sleeve 20 past first open end 21 of sleeve 20 (e.g., as shown in FIGS. 1 and 2), regardless of the position of first airflow-blocking element 10 along its biasing axis.

Biasing suspension 40 thus allows first airflow-blocking element 10 to move along its biasing axis in a direction away from second airflow-blocking element 210, e.g. upon the impinging of at least one elongate tube onto a radially outermost surface 17 of element 10 as the at least one elongate tube is passed through first open end 21 of sleeve 20. In some embodiments, the force of an impinging elongate tube may be all the force that is needed to move first airflow-blocking element 10 against the biasing force. That is, in such embodiments biasing suspension 40 may be configured so that the moving of first airflow-blocking element 10 away from second airflow-blocking element 210 occurs automatically upon the impinging of at least one elongate tube on element 10. In other embodiments, an operator may manually assist (e.g., with fingers or with some other useful tool) first airflow-blocking element 10 in moving against the biasing force. In still other embodiments apparatus 1 may comprise one or more actuating handles that can be operated to assist in the moving of first airflow-blocking element 10 against the biasing force. If desired, apparatus 1 may comprise a catch (e.g., a latch) so that first airflow-blocking element 10 can be held away from second airflow-blocking element 210 (e.g., can be held in an open position in which an elongate tube can be more easily passed through open end 21 of sleeve 20). Such a catch can then be released when it is desired to have biasing suspension 40 urge first airflow-blocking element 10 back toward second airflow-blocking element 210 (i.e., toward a closed position).

In at least some embodiments, elongated, open-ended sleeve 20 comprises sidewalls. The term primary sidewalls is used herein to denote sidewalls toward which, and away from which, first airflow-blocking element 10 can move along its biasing axis $A_b$. In FIGS. 1 and 2, first primary sidewall 23 is the sidewall toward which first airflow-blocking element 10 moves when it moves away from second airflow-blocking element 210; second primary sidewall 24 is the sidewall toward which first airflow-blocking element 10 moves when it moves toward second airflow-blocking element 210. The term transverse sidewalls is used to denote sidewalls of sleeve 20 that are oriented at least generally parallel to biasing axis $A_b$ (and that are at least generally orthogonal to primary sidewalls 23 and 24). Exemplary first transverse sidewall 25 and second transverse sidewall 26 are shown in FIG. 1 (with a portion of first transverse sidewall 25 cut away to show the interior of sleeve 20); a second transverse sidewall 26 is likewise visible in FIG. 2, with first transverse sidewall 25 having been omitted in this view to better show the interior of sleeve 20.

Sleeve 20 thus has a transverse axis that extends between transverse sidewalls 25 and 26 of sleeve 20, which transverse axis is oriented at least generally orthogonally to biasing axis $A_b$ (and is also oriented at least generally orthogonally to the long axis of sleeve 20). In some embodiments, first airflow-blocking element 10 may extend at least generally along the transverse axis of sleeve 20 so as to comprise a first transverse end 11 that is proximate first transverse sidewall 25 of sleeve 20, and a second transverse end 12 that is proximate second transverse sidewall 26 of sleeve 20. (Transverse ends 11 and 12 of first airflow-blocking element 10 are most easily seen e.g. in FIG. 3, which is a side-rear perspective view of the exemplary apparatus of FIG. 2). In some embodiments, first transverse end 11 of first airflow-blocking element 10 at least closely abuts first transverse sidewall 25 of sleeve 20 and a second transverse end 12 of first airflow-blocking element 10 at least closely abuts second transverse sidewall 26 of sleeve 20. As used herein, to closely abut (as applied to any two items mentioned herein) means to approach to within an average distance of 2 mm or less. In various embodiments, any two items that are stated herein to at least closely abut each other may approach each other to an average distance of less than 1 mm, 0.5 mm, or 0.2 mm. In specific embodiments such items may contact each other as will be evident from discussions later herein.

Figures 4, 5:
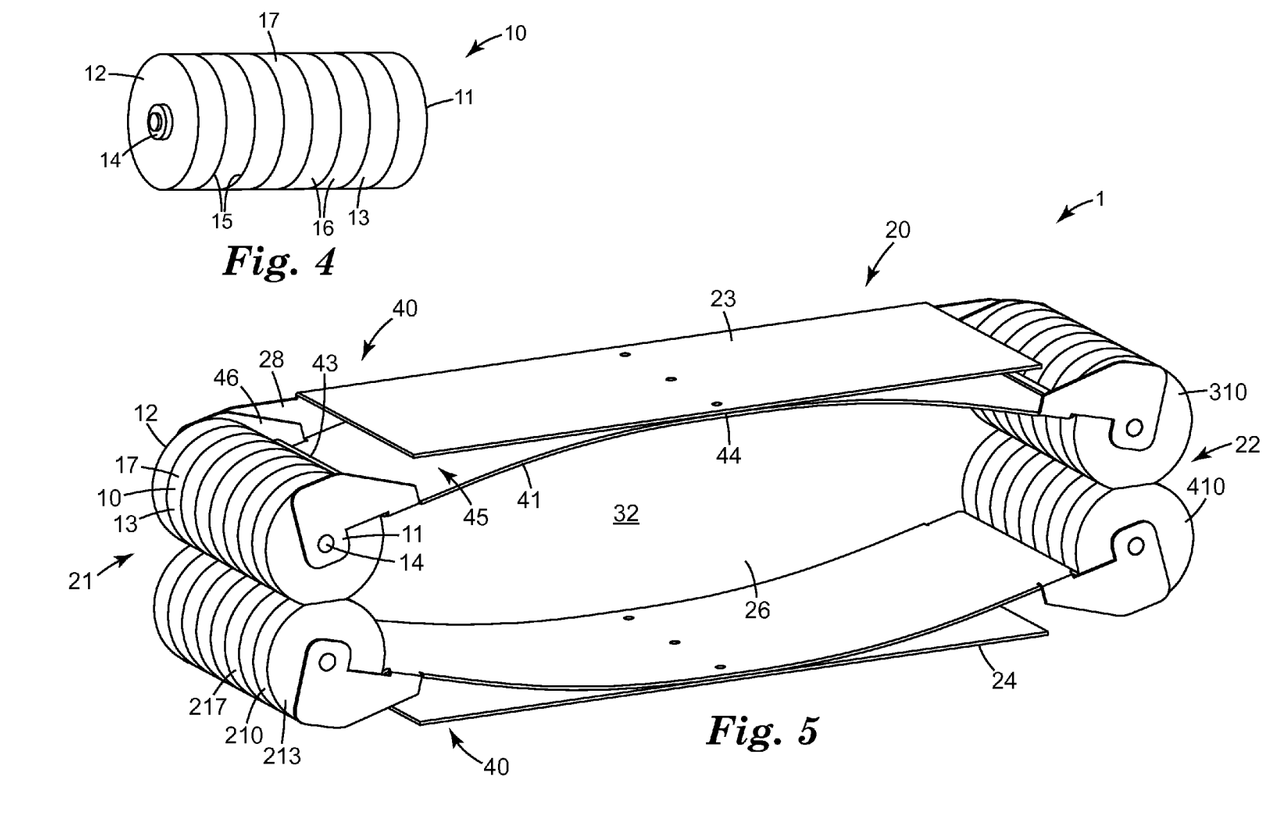
FIG. 4 is an isolated front perspective view of an exemplary airflow-blocking element.
FIG. 5 is a side-front perspective view in cutaway of another exemplary firestopping apparatus.

With reference to FIG. 4, which shows an isolated front view of an exemplary airflow-blocking element 10 (omitting components of element 10 that may be used to connect element 10 to a suspension), in some embodiments an airflow-blocking element 10 may comprise an at least generally cylindrical shape with a radially outermost surface 17 that is configured to contact (in at least some situations) a radially outermost surface 217 of an adjacent, second airflow-blocking element 210 with which first airflow-blocking element 10 is used. In some embodiments, element 10 may comprise a resiliently compressible material 13 that at least generally circumferentially surrounds, and is supported by, a support shaft 14. Material 13 can be any material that is resiliently compressible under the biasing force provided by biasing suspension 40, and that provides a satisfactory barrier to air flow, either alone or in combination with a barrier layer as disclosed below. Such a resiliently compressible material might be e.g. an elastomeric foam, such as foam rubber, sponge, or the like. In some embodiments, material 13 may have closed cells; however, in other embodiments material 13 may be an open-cell material e.g. if the cell walls provide, in the aggregate, a sufficient barrier to air flow through the material. If the material has a surface skin (that provides radially outermost surface 17 of element 10) that provides an airflow barrier, the internal airflow resistance of the material may be immaterial. Likewise, in some embodiments, an airflow-barrier layer (e.g. in the form of a thin annular layer, e.g. a film or foil, that is wrapped around the radially outermost surface of material 13) may be used to provide radially outermost surface 17 of element 10, so that in such embodiments, the airflow resistance of material 13 may not be an issue. In some embodiments, major surface 17 of airflow-blocking element 10 (e.g., as provided by a major surface of resiliently compressible sleeve 13) may be generally linear along the long axis of element 10. In other embodiments, major surface 17 may be non-linear. For example, radially outermost surface 17 of element 10, and radially outermost surface 217 of element 210, may comprise complementary (mating) scalloped or undulating patterns.

In various embodiments, material 13 may be a resiliently compressible polymeric foam or sponge (e.g., a polyurethane foam or any other suitable polymeric foam) e.g. with a density of no greater than about 150, 100, 50, or 20 kilogram per cubic meter. If desired, empty cavities, void spaces, or the like (e.g., cut-outs) may be provided e.g. within the interior of material 13 so as to enhance the resilient compressibility thereof. In some embodiments, at least first airflow-blocking element 10, and specifically the resiliently compressible material 13 thereof, does not include any firestop material. By this is meant that in such embodiments material 13 does not comprise any substance that is an intumescent, endothermic, and/or ablative firestop material as these terms are commonly understood by the ordinary artisan. However, in some embodiments, material 13 might comprise e.g. a flame-retardant additive (or might be comprised of a polymeric material that is at least somewhat inherently flame-retardant).

The above discussions make it clear that the herein-described arrangements allow apparatus 1 and sleeve 20 thereof to be provided with airflow-blocking elements that are separate and independent from e.g. any intumescent firestop materials of apparatus 1/sleeve 20. It will be appreciated that such arrangements can advantageously allow materials and configurations of the airflow-blocking elements to be advantageously chosen to enhance the blocking of airflow as described herein, while also allowing the materials and configuration of any intumescent firestop material (e.g., an intumescent pad 130) to be advantageously chosen to enhance the ability of the firestop material to e.g. expand in the event of exposure to high temperatures. This is in contrast to designs in which one or more elements must serve in an airflow-blocking capacity and must also possess intumescent expandability. That is, the arrangements disclosed herein allow the airflow-blocking function of elements 10/210 etc. to be advantageously decoupled from e.g. an intumescently-expanding function of a firestop pad 130.

As most easily seen in the isolated view of FIG. 4, in some embodiments resiliently compressible material 13 may take the form of a cylindrical sleeve that is mounted on a support shaft 14 so as to reside radially outward of support shaft 14 and to generally, substantially, or completely circumferentially surround support shaft 14 (with the latter arrangement being shown in FIG. 4 and in many of the other Figures herein). Such a resiliently compressible cylindrical sleeve 13 may have a long axis that is at least generally aligned with the transverse axis of elongated, open-ended sleeve 20, as seen e.g. in FIG. 3. In at least some embodiments, at least a transversely-extending section of resiliently compressible cylindrical sleeve 13 is at least partially rotatable about a rotation axis that is aligned with the long axis of support shaft 14. In some embodiments, the entire transverse length of sleeve 13 may be rotatable about such a rotation axis. This may be achieved e.g. by providing that sleeve 13 is rotatable with respect to shaft 14 (e.g., by mounting sleeve 13 on shaft 14 loosely enough that sleeve 13 can rotate around shaft 14); or, e.g. by rotatably mounting shaft 14 on suspension 40 so that shaft 14 and sleeve 13 can co-rotate together as a unit. If desired, both mechanisms can be used in combination.

As seen e.g. in FIG. 4, in some embodiments resiliently compressible cylindrical sleeve 13 may comprise a plurality of sections 16. Resiliently compressible sleeve 13 may be oriented with respect to elongated, open-ended sleeve 20 (as shown e.g. in FIG. 3) so that sections 16 are spaced generally along the transverse axis of elongated, open-ended sleeve 20, with each section 16 of resiliently compressible sleeve 13 extending generally along the transverse axis of elongated, open-ended sleeve 20 and being at least partially separated from a transversely adjacent section of sleeve 13 by a slit 15 that extends generally, substantially, or completely circumferentially around sleeve 13. In some embodiments, no such slits may be present. In various alternative embodiments, slits 15 may extend from a radially outermost surface 17 of resiliently compressible cylindrical sleeve 13, radially inward through at least 20, 40, 60, 80, 90, 95, or 100% of the radial thickness of sleeve 13. In embodiments in which slits 15 extend only partially through the radial thickness of sleeve 13, the main function of slit 15 may be to improve the differential compressibility of sleeve 13 as discussed below. However, in specific embodiments, at least some slits 15 may extend entirely through the radial thickness of sleeve 13. Such a design may allow each section 16 of sleeve 13 to be independently rotatable about shaft 14, regardless of the ability of any other section of sleeve 13 to rotate. (It will be appreciated that in such embodiments, resiliently compressible sleeve 13 is supplied collectively by the separate sleeve sections 16 acting in concert; thus the term resiliently compressible sleeve is used broadly herein and does not necessitate that all such sections of a sleeve must be physically connected to each other.)

It will be appreciated that it may be advantageous for the material of resiliently compressible sleeve 13 to have differential compressibility, by which concept is meant the ability for a portion of sleeve 13 to remain generally, substantially, or even completely in an uncompressed condition, even as a neighboring portion of sleeve 13 is compressed by having an elongate tube 90 impinged thereagainst. That is, it may be advantageous for portions of resiliently compressible sleeve 13 of first airflow-blocking element 10 that are not impinged upon by an elongate tube 90, to remain in an uncompressed condition so that they can remain at least closely abutted to (e.g., in contact with), second airflow-blocking element 210. As alluded to above, the presence of slits 15 can enhance this ability. It will thus be appreciated that in some embodiments, some of slits 15 may extend completely through the radial thickness of sleeve 13, so as to e.g. divide sleeve 13 into separate (e.g., independently rotatable) sections; and, other slits 15 may extend only partially through the radial thickness of sleeve 13 and thus may serve mainly to improve the differential compressibility thereof. (It will also be appreciated that such a slit may allow an elongate tube 90 of sufficiently small diameter to wedge at least somewhat into the slit, which might also enhance the blocking of airflow.)

The ability to provide airflow-blocking at locations of resiliently compressible sleeve 13 that are not in contact with an elongate tube 90 may be enhanced by choosing the biasing force supplied by suspension 40, in relation to the compressibility of sleeve 13 of first airflow-blocking element 10 (and also the compressibility of sleeve 213 of second airflow-blocking element 210 with which first airflow-blocking element 10 is used). Thus in some embodiments, suspension 40 may press first airflow-blocking element 10 against second airflow-blocking element 210 so that in the absence of any other force applied to move first airflow-blocking element 10 away from second airflow-blocking element 210 (e.g., the force applied by an impinging elongate tube 90), first airflow-blocking element 10 is compressed in areas in which it contacts second airflow-blocking element 210. Such a circumstance (which is manifested in FIGS. 2 and 3 by the flattening of contacting surfaces of sleeves 13 and 213 of the first and second airflow-blocking elements respectively) can be characterized in terms of a compression ratio. A compression ratio is defined herein as the radial thickness of sleeve 13 (i.e., the distance between the radially outwardmost and radially inwardmost surfaces of sleeve 13) with no force applied to sleeve 13 (that is, with first airflow-blocking element 10 held apart from second airflow-blocking element 210 and with no elongate tube 90 impinging thereon), divided by the radial thickness of sleeve 13 when first airflow-blocking element 10 is pressed against second airflow-blocking element 210 by biasing suspension 40. In various embodiments, such a compression ratio may be at least about 1.05, 1.1, 1.15, or 1.2. It is noted that sleeve 213 of second airflow-blocking element 210 may also be subject to such compression (as shown in FIGS. 2 and 3) and that such a compression ratio may also be defined for sleeve 213, and in fact for any airflow-blocking element disclosed herein.

In some embodiments, the above guidelines may be used to achieve a particularly advantageous arrangement. Specifically, in some embodiments, the biasing force supplied by biasing suspension 40 (and optionally, a force supplied to second airflow-blocking element 210 by a similar biasing suspension) may be sufficiently high, and sleeves 13 and 213 may comprise sufficient differential compressibility, that upon passing an elongate tube 90 through first open end 21 of sleeve 20 so that tube 90 is in contact with a particular transverse portion of sleeve 13 of first airflow-blocking element 10 and with a particular transverse portion of sleeve 213 of second airflow-blocking element 210, the radially outermost surface 17 of a transversely neighboring portion of first sleeve 13 at least closely abuts the radially outermost surface 217 of a transversely neighboring portion of second sleeve 213. That is, in such embodiments the surfaces of sleeves 13 and 213 may remain at least closely abutting or even in contact with each other in areas wherein no elongate tube passes therebetween, even though in adjacent areas of the sleeves, the material of sleeves 13 and 213 may have been compressed to accommodate an elongate tube therebetween.

Various biasing suspensions 40 will now be discussed with reference to FIGS. 2-3 and 6-8. It will be understood that any of the above-discussed features may be present in any of the designs embodied in these Figures.

Figure 3:
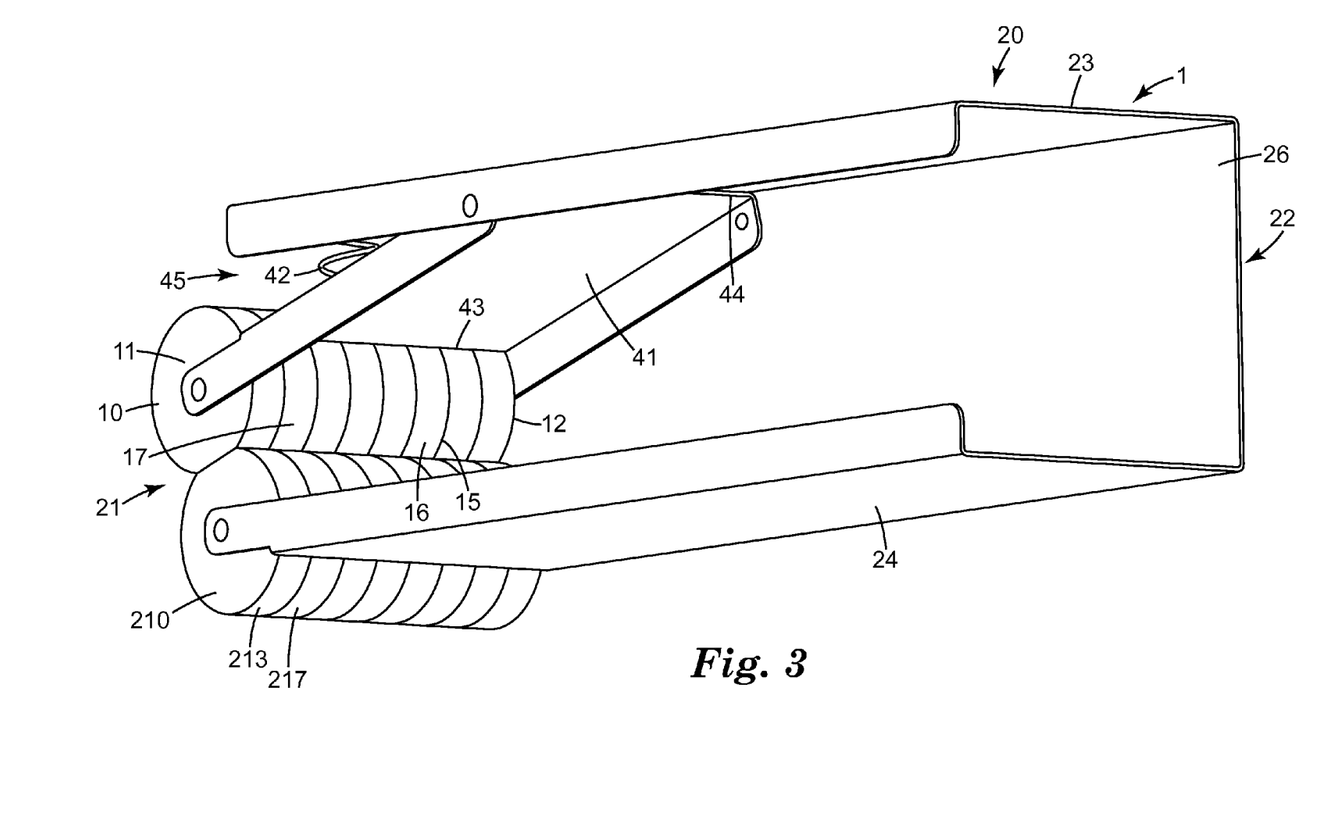
FIG. 3 is a side-rear perspective view in cutaway of the exemplary apparatus of FIG. 2.

FIGS. 2-3 depict a biasing suspension 40 in one exemplary embodiment (in FIGS. 2-3, first transverse sidewall 25 has been omitted in order to show the interior of sleeve 20). In such an embodiment, first airflow-blocking element 10 is connected to sleeve 20 by plate 41, which plate is hingedly connected to one or more sidewalls of sleeve 20 so that first airflow-blocking element 10 can move back and forth along biasing axis $A_b$. Biasing spring 42 (which in the depicted illustration is a coil spring, but can be any suitable spring or resilient element) serves to bias first airflow-blocking element 10 toward second airflow-blocking element 210. (In the illustrated embodiment of FIGS. 2-3, second airflow-blocking element 210 is not movable toward or away from first airflow-blocking element 10, but is rotatably connected to sleeve 20). In embodiments of this type, plate 41 and spring 42 thus combine to provide biasing suspension 40.

Shaft 14 of first airflow-blocking element 10 may be connected, e.g. rotatably connected, to plate 41 in any suitable manner. In at least some embodiments, plate 41 may not only serve as part of biasing suspension 40, but may also function as a sealing plate. To provide such an effect, plate 41 may comprise a first end portion 43 that at least closely abuts radially-outward surface 17 of resiliently compressible material 13 of first airflow-blocking element 10, may further comprise a second end portion 44 that at least closely abuts first primary sidewall 23 of sleeve 20, and may also comprise first and second transverse edges that respectively at least closely abut first and second transverse sidewalls 25 and 26 of sleeve 20 (all of which components and relationships are most easily seen in FIG. 3). Sealing plate 41 may be configured so that first end portion 43 of sealing plate 41 remains at least closely abutted with radially-outermost surface 17 of the resiliently compressible material 13 regardless of the position of first airflow-blocking element 10 along its biasing axis, and regardless of any rotation of resiliently compressible material 13 about a rotation axis. In addition, second end portion 44, and first and second minor edges, of sealing plate 41 may all remain at least closely abutted to their respective sidewalls regardless of the position of sealing plate 41 along its permitted range of motion. Such arrangements can allow sealing plate 41, in combination with the various sidewalls of sleeve 20 and with first airflow-blocking element 10, to provide a dead-end cavity 45, as denoted in FIGS. 2 and 3. This can provide that any air that might flow around the "backside" of first airflow-blocking element 10 (that is, the side away from second airflow-blocking element 210) can penetrate only into dead-end cavity 45 and cannot unacceptably flow therefrom into or through interior space 32 of sleeve 20. It will be noted that a similar sealing function (although without the formation of a dead-end cavity), may be achieved with regard to second airflow-blocking element 210 by providing second primary sidewall 24 with a first end portion that at least closely abuts radially outermost surface 217 of second airflow-blocking element 210, as evident in FIG. 3.

FIG. 5 depicts an apparatus 1 with another exemplary embodiment of biasing suspension 40 (in similar manner to FIGS. 2-3, first transverse sidewall 25 has been omitted from FIG. 5 in order to show the interior of sleeve 20). In embodiments of this general type, plate 41 can not only support first airflow-blocking element 10 so that first airflow-blocking element 10 can move along its biasing axis, plate 41 may also serve as a leaf spring, thus it can provide the biasing force as well. In the illustrated embodiment plate 41 is attached to first primary sidewall 23, and comprises brackets 46 attached thereto, to which brackets shaft 14 of first airflow-blocking element 10 may be connected, e.g. rotatably connected.

FIG. 5 also depicts an embodiment that differs from FIGS. 2-3 in that second airflow-blocking element 210 is able to move toward and away from first airflow-blocking element 10; furthermore, it is biased toward first airflow-blocking element 10. Similar to FIGS. 2-3, some compression of resiliently compressible materials 13 and 213 of the respective airflow-blocking elements is visible, and in this case is due to the combined biasing forces applied to both of the airflow-blocking elements. In the illustrated embodiment, second airflow-blocking element 210 is supported and biased by a suspension that is similar to that used for first airflow-blocking element 10; however, the two suspensions (and in general, any detail regarding the method of supporting and biasing the respective airflow-blocking elements) can be different if desired.

FIG. 5 depicts an embodiment that differs from FIGS. 2-3 still further in that it includes third and fourth airflow-blocking elements 310 and 410, which are arranged proximate second open end 22 of sleeve 20. In the illustrated embodiment, elements 310 and 410 are arranged in similar manner to elements 10 and 210—that is, they are both able to move toward and away from each other, and they are both biased toward each other by a leaf spring. In fact, it is evident that in such embodiments, a single member (e.g. a piece of sheet steel or the like, fastened at its midpoint to primary sidewall 23) can be advantageously used to provide the leaf springs for elements 10 and 310, and another single member can be used to provide the leaf springs for elements 210 and 410.

In similar manner to the embodiment of FIGS. 2-3, plate 41 of FIG. 5 not only serves as part of biasing suspension 40, but also functions as a sealing plate. That is, plate 41 comprises a first end portion 43 that at least closely abuts radially-outward surface 17 of resiliently compressible material 13 of first airflow-blocking element 10 (in FIG. 5, end portion 43 takes the form of a curled lip). Plate 41 further comprises a second end portion 44 that closely at least abuts first primary sidewall 23 of sleeve 20 (in FIG. 5, this end portion contacts, and is in fact attached to, primary sidewall 23). Plate 41 also comprises first and second transverse edges that respectively closely abut first and second transverse sidewalls 25 and 26 of sleeve 20. Thus, a dead-end cavity 45 is provided to handle any airflow around the backside of first airflow-blocking element 10, in similar manner as discussed earlier. Moreover, in the illustrated embodiment, similar dead-end cavities are provided to likewise handle any airflow around the backsides of second, third and fourth airflow-blocking elements 210, 310 and 410.

Figure 6:
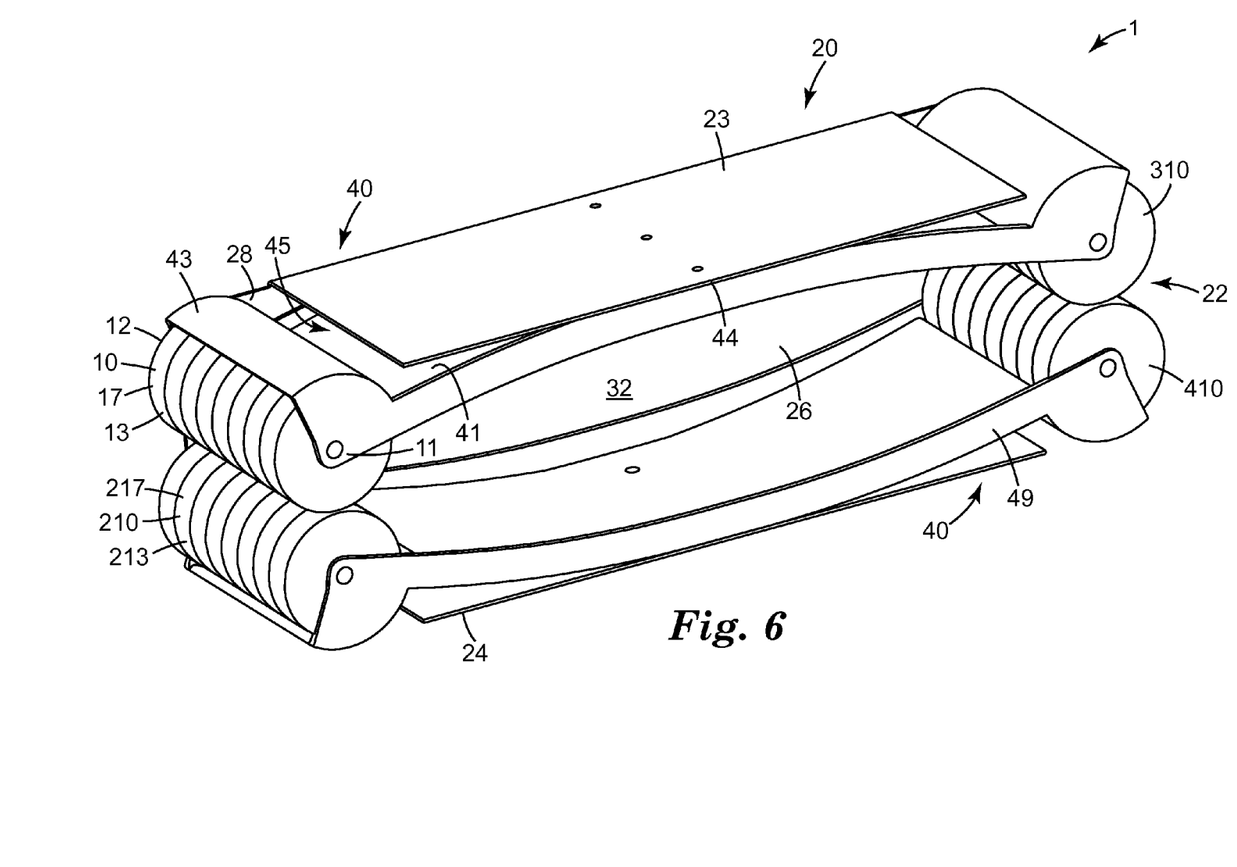
FIG. 6 is a side-front perspective view in cutaway of another exemplary firestopping apparatus.

FIG. 6 depicts an apparatus 1 with another exemplary embodiment of biasing suspension 40 (in similar manner to FIGS. 2-3 and 5, first transverse sidewall 25 has been omitted from FIG. 6 in order to show the interior of sleeve 20). This embodiment is similar to that of FIG. 5, a difference being that the first end portion 43 of sealing plate 41 (that at least closely abuts radially-outward surface 17 of resiliently compressible material 13 of first airflow-blocking element 10) takes the form of a partial shroud (e.g., a fender or shield) that extends circumferentially around an approximately 90 degree portion of first airflow-blocking element 10 (while remaining at least closely abutted with surface 17 over this distance). Also, sealing plate/leaf spring 41 comprises transverse flanges 49 which may e.g. provide enhanced mechanical integrity and/or may at least closely abut transverse sidewalls 24 and 25 so as to minimize air leakage. Another small difference is that the shaft of first airflow-blocking element 10 is attached (e.g., rotatably attached) to a flange portion of plate 41 (rather than being attached to plate 41 via bracket 46 as in the embodiment of FIG. 5).

Figure 7:
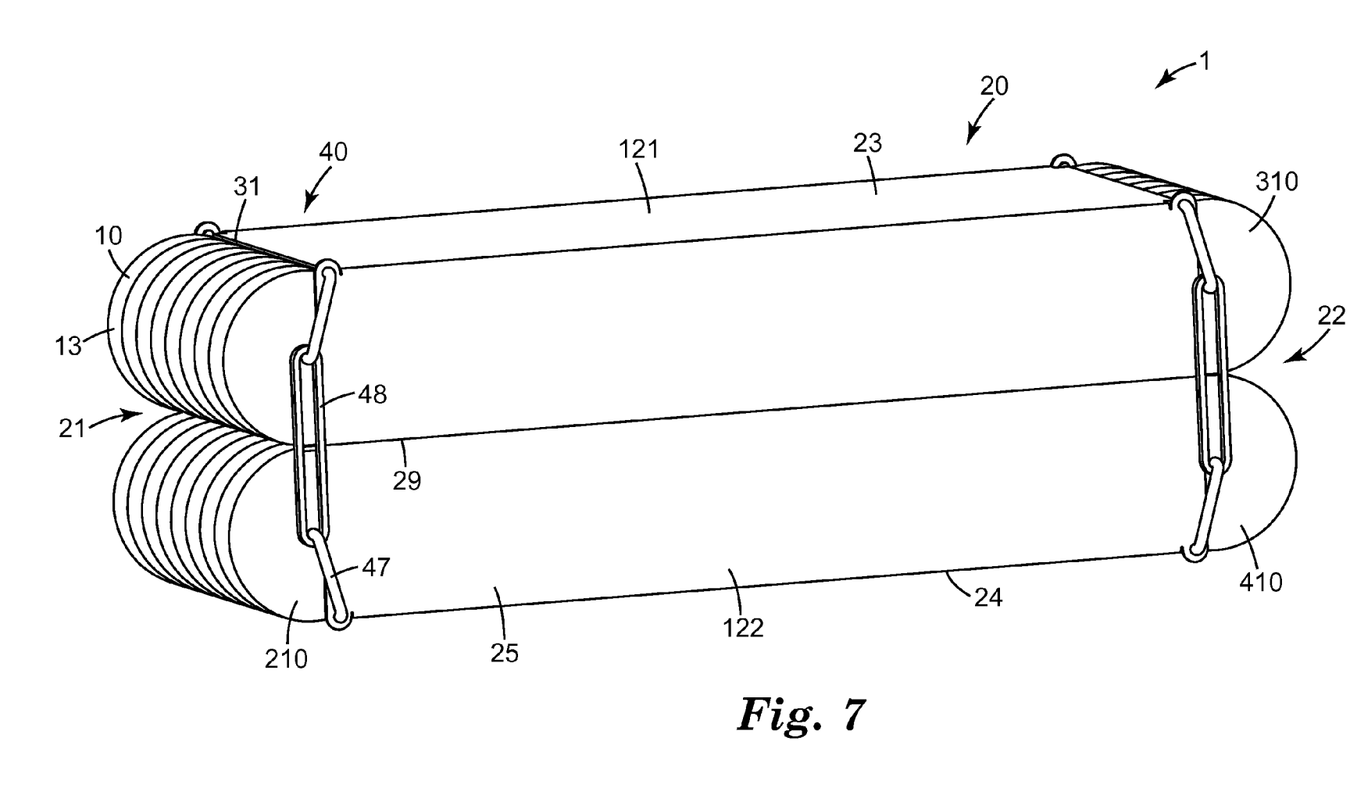
FIG. 7 is a side-front perspective view of another exemplary firestopping apparatus.

FIG. 7 depicts an apparatus 1 with another exemplary embodiment of biasing suspension 40. In embodiments of this general type, first airflow-blocking element 10 and second airflow-blocking element 210 are each connected to sleeve 20 by being attached (e.g., rotatably attached) to connecting rods 47, which rods 47 are pivotably attached to sleeve 20. First airflow-blocking element 10 and second airflow-blocking element 210 are co-biased toward each other, by one or more biasing mechanisms that act on both first airflow-blocking element 10 and second airflow-blocking element 210. In the illustrated embodiment, such a co-biasing mechanism is supplied by elastic bands 48 (noting that a second elastic band can likewise be provided on the side of elements 10 and 210 that are not visible in FIG. 7). A similar arrangement is provided for third and fourth airflow-blocking elements 310 and 410.

It will be appreciated that FIG. 7 thus represents a general type of embodiment in which a pair of airflow-blocking elements are co-biased toward each other by the same mechanism or mechanisms (as opposed to only one element being biased, or each element being separately biased). In various embodiments, one, or both, of such co-biased elements may be able to move along the biasing axis (with the latter arrangement being depicted in FIG. 7). And, in FIG. 7, the biasing devices (elastic bands 48) are located outside of sleeve 20 rather than being inside sleeve 20 as in at least some of the previously-discussed embodiments. It is thus emphasized that any suitable biasing or co-biasing mechanisms and devices, located at any suitable position inside, outside, or partially inside and partially outside, of sleeve 20 may be used. Such biasing devices may comprise e.g. one or more coil springs, leaf springs, torsion springs, flat springs, elastic bands, compressive members (e.g., blocks of foam rubber), and so on, arranged in any suitable manner. Any biasing element (as well as any other component of a biasing suspension), particularly if located at least partially outside of sleeve 20, may be comprised of flame-resistant and/or flame-retardant materials if desired.

It will also be appreciated that in FIG. 7, an edge of an end portion of a primary sidewall at least closely abuts a surface of each airflow-blocking element (e.g., to provide that no unacceptable airflow around the backside of any element occurs). Given all of the different embodiments that have been described herein, it is noted that such at least close abutment can be provided by a simple edge of a primary sidewall (e.g., an edge of sidewall 24 that closely abuts second airflow-blocking element 210 in FIG. 3, and an edge 31 of sidewall 23 that closely abuts first airflow-blocking element 10 in FIG. 7). Or it can be provided by a simple edge of a sealing plate (e.g., edge 43 of plate 41 that closely abuts first airflow-blocking element 10 in FIG. 3); or, by a curled lip (e.g., lip 43 of FIG. 5); or, by a partial shroud (e.g., shroud 43 of FIG. 6). It is thus emphasized that many variations on such concepts are possible, as long as the various surfaces are close enough to each other, and can remain so throughout any movement of the respective components, to provide that airflow between the surfaces is acceptably minimized. It will also be appreciated that if the at least close abutment is to a movable surface (e.g., the radially outermost surface of a rotatable airflow-blocking element), the distance of abutment (or, the pressure that an abutting surface applies against the movable surface, if the surfaces are in actual contact with each other) should be designed to ensure that adequate movement is permitted. (In many cases such at least close abutment may extend generally, substantially or completely along the entire extent of the adjacent surfaces of the various components, e.g. as shown in many of the Figures herein).

It will be understood that the above-mentioned condition that a transverse end of an airflow-blocking element may at least closely abut a transverse sidewall of the elongated, open-ended sleeve, may be provided not only by a transverse end of a resiliently compressible cylindrical sleeve of the airflow-blocking element, but also could be provided by some other component of the airflow-blocking element, e.g. by bracket 46 as described herein. And, in more general terms, any suitable gasket, weatherstrip, member, or space-filling material may be provided in at least a portion of a space between any two proximate portions of any components of apparatus 1, e.g. in order to minimize the passage of air through that space. Thus, the herein-described conditions of e.g. at least closely abutting, or contacting, a surface of a component or portion of apparatus 1 (e.g., a sidewall of sleeve 20) broadly encompasses any situation in which such a surface is a surface of e.g. a protrusion, dam, gasket, etc., that extends from a component or portion of e.g. sleeve 20.

It will also be appreciated that the provision that two surfaces may e.g. at least closely abut each other, may not be required if there is no possibility of unacceptable air leakage between the two surfaces (e.g., if a passage between the two surfaces leads to a dead-end space as described above). Still further, such a provision may not necessarily be required between every two surfaces, e.g. if the collective air leakage between all such surfaces is sufficiently small e.g. so that the total airflow through apparatus 1 is sufficiently low. Such an overall airflow can be characterized e.g. in terms of an L rating, which will be well known to those of ordinary skill. Such an L rating can be obtained by testing apparatus 1 in generally similar manner as outlined in UL Test Procedure 1479, in which an air pressure differential of approximately 75 Pa (0.3 inches of water) is applied to apparatus 1 and the volume of airflow therethrough is measured. In various embodiments, apparatus 1 may comprise an L rating of less than about 50, 20, 10, 5, 2, or 1 cubic foot per minute of airflow per square foot.

Sleeve 20 may be made of any suitable material. In some embodiments, sleeve 20 may be made of metal, e.g., 16 gauge sheet steel, 18 gauge sheet steel, and so on. In some embodiments, sleeve 20 may be at least generally rectangular in cross-section (e.g., when viewed along its long axis); in specific embodiments sleeve 20 may be generally, substantially or strictly square in cross-section. However, in other embodiments sleeve 20, or at least portions thereof along the long axis of sleeve 20, may be other shapes, e.g. oval, circular, or irregular. In various embodiments, sleeve 20 may be provided in various sizes to fit various size openings in walls, and in various lengths as desired. When used in a wall opening, sleeve 20 may contain one or more elongate tubes 90 passing through interior space 32 thereof, as shown in exemplary embodiment in FIG. 1. As used herein, terms such as tube and tubing are used broadly to encompass any item or items such as wire, pipe, coaxial cable, fiber optic cable, tubing, conduit, and so on, whether carrying electricity for power, electricity for signaling, optical signals, and the like, which it might be desired to pass through an opening in a wall.

In some embodiments, sleeve 20 may be comprised of a single piece that is not disassemblable into two or more separate pieces, nor may any major part (i.e., sidewall) of such a single-piece sleeve be movable relative to another major part thereof. In alternative embodiments, sleeve 20 may comprise a hinge on one sidewall of sleeve 20, which hinge may be oriented generally along the long axis of sleeve 20 so that sleeve 20 can be opened and closed repeatedly as desired. Such an arrangement is shown in exemplary embodiment in FIG. 8, in which a sleeve 20 (of the general type depicted in FIG. 5) comprises first and second elongated parts 36 and 37 that are hingedly connected by hinge 33, and that comprise respective edges 34 and 35 that can be at least closely abutted against each other (e.g., can be contacted with each other) when parts 36 and 37 are closed together clamshell-style to form sleeve 20.

Any hinged connection may be used, whether such a connection allows the hingedly connected sleeve parts to be disconnected from each other or not. In some embodiments, a hinged connection may be accomplished by the placement of one or more labels on the sleeve parts 36 and 37 (in such embodiments, parts 36 and 37 may be separate pieces). Such a label (which may e.g. be adhesively attached to sleeve pieces 36 and 37) may already be desired to be present, e.g. to identify the product, to provide instructions to a user, to mark an axial centerpoint, etc. For the purposes outlined herein, a label may be attached (e.g., by adhesive bonding) to outer surfaces of sleeve pieces 36 and 37, spanning a seam between the two sleeve pieces, so that the portion of the label that spans the seam functions as a hinge that allows the sleeve parts to be opened into a clamshell configuration and then reclosed, as described in further detail in U.S. Pat. No. 8,069,623 to Colwell et al., which is incorporated herein by reference in its entirety.

In some embodiments, sleeve 20 may be comprised of two (or more) sleeve pieces (e.g., sleeve pieces 121 and 122 as shown in exemplary embodiment in FIG. 7), which sleeve pieces can be taken apart from each other (with biasing suspension 40 being disconnected if needed) and can then be mated with each other (re-assembled) to form sleeve 20. (Such sleeve pieces may be, but do not have to be, similar to each other or even identical to each other.) Any suitable design may be used for sleeve parts that are mateable to each other to form sleeve 20, and in particular any suitable design may be used for the mating edges of such parts. Such a mating edge might comprise e.g. a plurality of tabs (e.g., in the manner of interlocking teeth); or, such an edge might comprise e.g. a single elongate tab of the general type illustrated in FIGS. 3-5 of U.S. Pat. No. 8,069,623. All that is needed is that the edges of two such sleeve pieces are satisfactorily mateable to each other. Such edges may mate to each other to form seams. For example, a sleeve formed by the mating of sleeve pieces may comprise at least two generally axially oriented seams formed by the abutting of long edges of sleeve pieces against each other. Such an arrangement is shown in exemplary illustration in FIG. 7, in which sleeve 20 is formed of two pieces 121 and 122 whose edges meet to form seams 29.

Figure 8:
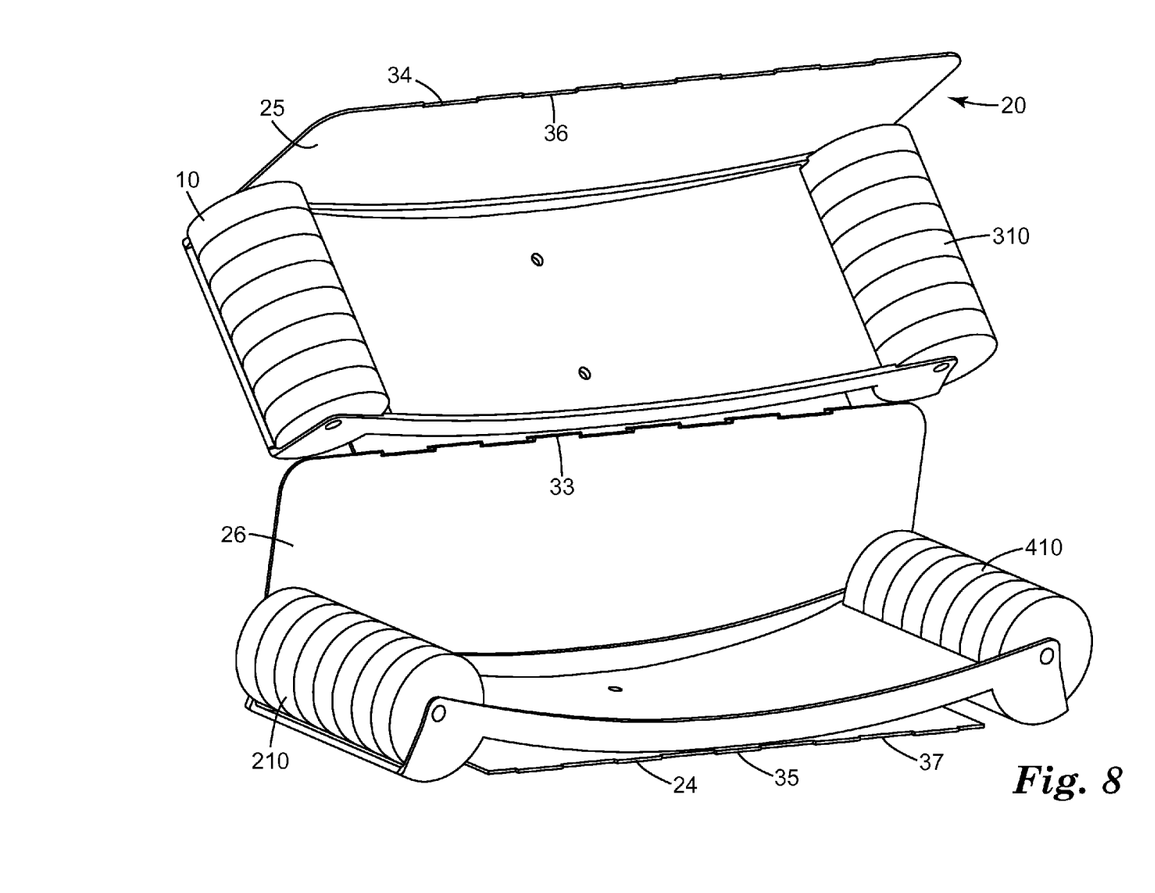
FIG. 8 is a side-front perspective view of an exemplary firestopping apparatus that is openable and closeable in clamshell style.

In some embodiments, such sleeve pieces may be somewhat similar, as in the design of FIG. 8. That is, in such embodiments each sleeve piece might comprise two sidewalls; or each sleeve piece might provide the entirety of one sidewall and a partial portion of two neighboring sidewalls. In other embodiments, a first sleeve piece may comprise e.g. a generally C-shaped cross section (in which the sleeve piece supplies three of the four sidewalls of the sleeve), with a second sleeve piece supplying the fourth sidewall. A design of this general type is shown in FIG. 3, in which a first sleeve piece supplies sidewalls 23, 24 and 26 (and also comprises flanges to facilitate the attaching of a second sleeve piece thereto), and in which a second sleeve piece (omitted in the view of FIG. 3) supplies only the fourth sidewall (the nearest sidewall, in the view of FIG. 3). It will be understood that many variations on such designs are possible.

It will be appreciated that hinged designs and/or multi-piece designs of sleeve 20 may be advantageous in at least some circumstances. That is, if a sleeve is to be used e.g. in the firestopping of a newly created opening in a wall (e.g., that does not contain tubing already inserted therethrough), sleeve 20 may be placed in the opening as is (that is, with a hinged sleeve in its closed position, or with a multi-piece sleeve in its assembled condition). If to be used in firestopping an opening that already contains tubing inserted therethrough, it may be necessary to open and/or at least partially disassemble sleeve 20 in order to position the tubing within sleeve 20. Thus, a sleeve may be provided with a hinged connection so that it can be momentarily opened for insertion of tubing thereinto and then reclosed clamshell-style to reform sleeve 20. Similarly, sleeve pieces may be disassembled from each other for insertion of tubing, and then reassembled to each other to reform sleeve 20.

In many of the embodiments illustrated and discussed herein, a portion of first airflow-blocking element 10 may protrude outwardly (away from second airflow-blocking element 210) beyond primary sidewall 23 of sleeve 20 when first airflow-blocking element 10 is moved to a fully open position. In view of this, apparatus 1 may be conveniently positioned within a through-penetrating opening 83 of wall 80, so that first end 21 of sleeve 20 protrudes sufficiently far away from wall 80 that wall 80 does not prevent airflow-blocking element 10 (or, any such element) from moving. Similarly, if any cover plate is used to mount sleeve 20 to wall 80, such a cover plate can be positioned so as to not prevent any airflow-blocking element from moving (e.g., as shown in FIG. 1). And, in some embodiments primary sidewall 23 may terminate e.g. as shown in FIGS. 5 and 6 (e.g., sidewall 23 may not extend as far forward as does frontmost portion 28 of transverse sidewall 26), in order to provide adequate room for movement of first airflow-blocking element 10. This may be of no consequence (that is, terminating sidewall 23 at such a location may not allow any airflow to unacceptably enter interior space 32 of sleeve 20) given e.g. the providing of a dead-end space as discussed earlier herein. Other primary sidewalls and ends thereof may be similarly designed, as seen e.g. in FIGS. 5 and 6. Still further, while second, third and fourth airflow-blocking elements 210, 310 and 410 have not been described in detail herein, any of the features and properties described with regard to first airflow-blocking element 10, may also be present in any such additional airflow-blocking elements, if such additional elements are present in apparatus 1. In some embodiments, linkages (e.g., pushrods and the like) may be provided between the pairs of airflow-blocking elements e.g. so that the moving of first and second airflow-blocking elements along their biasing axis, may cause the third and fourth airflow-blocking elements to move along their biasing axis (or vice versa).

In some embodiments, no component (excepting any cover plate 140 as might be optionally used) of apparatus 1 extends or protrudes transversely outward past a transverse sidewall of sleeve 20. (Such an arrangement may be advantageous if it is desired to abut multiple apparatus 1's closely together.) In some embodiments, no part of the resiliently compressible material of the first airflow-blocking element is attached (directly or indirectly) to elongated, open-ended sleeve 20 so that it cannot move relative thereto. Also, a sleeve as disclosed herein does not necessarily have to exhibit a square, or even rectangular cross-section, throughout the entire elongate length of the sleeve or even at any particular location along the elongate length of the sleeve. In the case of a sleeve with e.g. an oval, irregular, or even circular cross-section, such a sleeve can still be provided with first and second airflow-blocking elements (and third and fourth elements, if desired) as disclosed herein. It is only needed that the elements be designed (e.g., with an arcuate or bowed shape) e.g. so that surfaces of the elements can be e.g. at least closely abutted against end portions of the sleeve, of a sealing plate, or the like.

Furthermore, although exemplary embodiments discussed herein have mainly concerned airflow-blocking elements that are e.g. generally cylindrical in shape (and in which at least transverse sections thereof may be rotatable), other designs, involving e.g. non-cylindrical shapes, are encompassed within the scope of the disclosures herein. For example, in some embodiments, an airflow-blocking element 10 might comprise e.g. an arcuate or semi-circular shape (when viewed along its long axis), e.g. with a body comprising a resiliently compressible material 13 positioned so as to mate with a resiliently compressible body of a second airflow-blocking element 10. Various shapes and configurations of resiliently compressible bodies, and methods of arranging such bodies, are discussed in detail in U.S. patent application Ser. No. 13/826,591, entitled "Firestopping Apparatus with Airflow-Blocking Elements", filed evendate herewith and incorporated by reference in its entirety herein. It is also emphasized that the term shaft (of an airflow-blocking element) is used broadly herein. Such a shaft might be solid, or hollow, and/or might be a single-piece shaft, or a multipiece shaft. Specifically, such a shaft does not necessarily have to extend continuously along the entire length of a resiliently compressive sleeve that the shaft supports. Rather, in some embodiments a shaft may be provided collectively e.g. by two posts that extend toward each other (one from a first transverse end of the resiliently compressible sleeve and one from the second, opposite transverse end of the resiliently compressible sleeve), but that do not necessarily meet or even closely approach each other.

In some embodiments, items described herein may be supplied as kits, which may include, for example one or more sleeves 20 and/or two or more sleeve pieces. Such kits may optionally include any or all of mounting plates, firestop materials (e.g. if not already supplied within sleeve 20) whether in the form of pads, putty, or the like, space-filling material, installation instructions, and so on.

An advantage of e.g. an at least generally cylindrical airflow-blocking element and in particular of a resiliently compressible cylindrical sleeve thereof, is that the element can serve to provide a large radius of curvature for one or more elongate tubes that are passed through sleeve 20. That is, in some situations gravity may cause a portion of an elongate tube that is outward of an open end of a sleeve to droop downward, with the undesired result that the elongate tube may bend too sharply (e.g., may kink). The presence of an at least generally cylindrical airflow-blocking element at the open end of the sleeve, particularly if at least a portion of the element protrudes at least partially outward from the open end of the sleeve, may minimize the chance of such kinking, and thus may eliminate the need to install an antikinking device (e.g., a so-called radius control module) at the open end of a sleeve.

LIST OF EXEMPLARY EMBODIMENTS

Embodiment 1

A firestopping apparatus for mounting into a through-penetrating opening in a wall, comprising: an elongated open-ended sleeve with a long axis, a transverse axis, and with first and second open ends, and which at least partially defines an interior space therein, which interior space allows passage of at least one elongate tube therethrough; and, first and second airflow-blocking elements, each of the first and second airflow-blocking elements being positioned proximate the first open end of the sleeve and extending at least generally along the transverse axis of the sleeve so as to comprise a first transverse end that is proximate a first transverse sidewall of the sleeve and a second transverse end that is proximate a second transverse sidewall of the sleeve; wherein at least the first airflow-blocking element comprises a resiliently compressible material that at least generally circumferentially surrounds, and is supported by, a support shaft that is connected to the sleeve by a biasing suspension that biases the first airflow-blocking element toward the second airflow-blocking element along a biasing axis.

Embodiment 2

The apparatus of embodiment 1 wherein each of the first and second airflow-blocking elements extends along the transverse axis of the sleeve so as to comprise a first transverse end that at least closely abuts a first transverse sidewall of the sleeve and a second transverse end that at least closely abuts a second transverse sidewall of the sleeve;

Embodiment 3

The apparatus of any of embodiments 1-2 wherein the biasing suspension is configured to allow the first airflow-blocking element to automatically move along its biasing axis in a direction away from the second airflow-blocking element, upon the impinging of at least one elongate tube onto a radially outermost surface of the first airflow-blocking element as the at least one elongate tube is passed through the first open end of the sleeve.

Embodiment 4

The apparatus of any of embodiments 1-3 wherein the support shaft of the first airflow-blocking element comprises a long axis that is oriented at least generally perpendicular to the biasing axis of the first airflow-blocking element and is at least generally aligned with the transverse axis of the sleeve.

Embodiment 5

The apparatus of embodiment 4 wherein the resiliently compressible material comprises a resiliently compressible cylindrical sleeve that resides radially outward of the support shaft and at least substantially circumferentially surrounds the support shaft, and that has a long axis that is at least generally aligned with the transverse axis of the elongated, open-ended sleeve.

Embodiment 6

The apparatus of embodiment 5 wherein at least a transversely-extending section of the resiliently compressible cylindrical sleeve is at least partially rotatable about a rotation axis that is aligned with a long axis of the support shaft.

Embodiment 7

The apparatus of any of embodiments 5-6 wherein the resiliently compressible cylindrical sleeve comprises a plurality of sections that are spaced generally along the transverse axis of the elongated, open-ended sleeve, each section of the resiliently compressible cylindrical sleeve extending generally along this transverse axis and being separated from a transversely adjacent section of the resiliently compressible cylindrical sleeve by a slit that extends from the radially outermost surface of the resiliently compressible cylindrical sleeve, radially inward through at least about 60% of a radial thickness of the resiliently compressible cylindrical sleeve at the location of the slit, and that extends entirely circumferentially around the resiliently compressible cylindrical sleeve.

Embodiment 8

The apparatus of embodiment 7 wherein each section of the plurality of sections of the resiliently compressible cylindrical sleeve is fully rotatable about a rotation axis that is aligned with the long axis of the support shaft, independently of any rotation of any other section.

Embodiment 9

The apparatus of any of embodiments 1-8 wherein at least a portion of the first airflow-blocking element protrudes outward along the long axis of the elongated, open-ended sleeve past the first open end of the elongated, open-ended sleeve, regardless of the position of the first airflow-blocking element along its biasing axis.

Embodiment 10

The apparatus of any of embodiments 1-9 wherein the apparatus further comprises at least one sealing plate with a first end portion that at least closely abuts the radially-outward surface of the resiliently compressible material of the first airflow-blocking element, with a second end portion that at least closely abuts a first primary sidewall of the sleeve; and with first and second transverse edges that respectively at least closely abut first and second transverse sidewalls of the elongated open-ended sleeve, wherein the first end portion of the sealing plate remains at least closely abutted with the radially-outward surface of the resiliently compressible material regardless of the position of the first airflow-blocking element along its biasing axis, and regardless of any rotation of the resiliently compressible material about a rotation axis that is generally transverse to the biasing axis.

Embodiment 11

The apparatus of embodiment 10 wherein the sealing plate is provided by a first end section of the sidewall, which first end section of the sidewall is configured so that the first end portion of the sealing plate is provided by a first-end lip of the first primary sidewall of the sleeve.

Embodiment 12

The apparatus of embodiment 10 wherein the first end portion of the sealing plate is provided by a first end portion of a support member of the biasing suspension, which support member combines with a portion of the first primary sidewall to define a dead-end compartment that is located between the first primary sidewall and the interior space of the elongated open-ended sleeve that allows passage of the at least one elongate tube therethrough.

Embodiment 13

The apparatus of embodiment 12 wherein the second end portion of the support member is hingedly connected to a sidewall of the elongated open-ended sleeve, and wherein at least one compression spring is provided within the dead-end compartment and is configured to bias the first end portion of the support member away from the first primary sidewall of the elongated open-ended sleeve.

Embodiment 14

The apparatus of embodiment 12 wherein the second end portion of the support member is connected to a sidewall of the elongated open-ended sleeve, and wherein the support member is provided in the form of a leaf spring that is configured to bias the first end portion of the support member away from the first primary sidewall of the elongated open-ended sleeve.

Embodiment 15

The apparatus of any of embodiments 1-14 wherein the second airflow-blocking element comprises a resiliently compressible material that at least generally circumferentially surrounds, and is supported by, a second support shaft that is connected to the elongated, open-ended sleeve by a second biasing suspension that biases the second airflow-blocking element toward the first airflow-blocking element along a biasing axis of the second airflow-blocking element.

Embodiment 16

The apparatus of any of embodiments 1-15 wherein the first and second airflow-blocking elements are each hingedly connected to the elongated, open-ended sleeve and are co-biased toward each other by at least one co-biasing mechanism that serves to co-bias the first and the second airflow-blocking elements toward each other.

Embodiment 17

The apparatus of any of embodiments 1-16 further comprising third and fourth airflow-blocking elements, each of the third and fourth elements being positioned proximate the second open end of the elongated open-ended sleeve and extending at least generally along the transverse axis of the elongated open-ended sleeve so as to comprise a first transverse end that is proximate the first transverse sidewall of the elongated open-ended sleeve and a second transverse end that is proximate the second transverse sidewall of the elongated open-ended sleeve; wherein at least the third airflow-blocking element comprises a resiliently compressible material that at least generally circumferentially surrounds, and is supported by, a support shaft that is connected to the elongated open-ended sleeve by a biasing suspension that biases the third airflow-blocking element toward the fourth airflow-blocking element along a biasing axis of the third airflow-blocking element.

Embodiment 18

The apparatus of any of embodiments 1-17 wherein upon passing an elongate tube through the first end of the elongated, open-ended sleeve so that the tube is in contact with a first transverse portion of the first airflow-blocking element and with a first transverse portion of the second airflow-blocking element, the radially outermost surface of a second transverse portion of the first airflow-blocking element at least closely abuts a radially outermost surface of a second transverse portion of the second airflow-blocking element.

Embodiment 19

The apparatus of any of embodiments 1-18 wherein the elongated open-ended sleeve is provided in the form of first and second elongated parts that are connected to each other by a hinged connection that is at least generally aligned with the long axis of the sleeve and that extends along at least a portion of the elongate length of the sleeve; wherein the first and second elongated parts each comprise an edge, which edges of the first and second elongated parts are closely abuttable against each other; and, wherein the elongated open-ended sleeve comprises a clamshell design in which the first and second elongated parts can be hingedly rotated into an open configuration and can be hingedly rotated into a closed configuration in which the edges of the first and second elongated sleeve parts are at least closely abutted against each other.

Embodiment 20

The apparatus of any of embodiments 1-18 wherein the elongated open-ended sleeve is provided in the form of first and second elongated pieces that are separable from each other and that are mateable to each other to form the sleeve.

Embodiment 21

The apparatus of any of embodiments 1-20 wherein at least the first airflow-blocking element does not include any firestop material.

Embodiment 22

The apparatus of any of embodiments 1-21 wherein no airflow-blocking element of the apparatus includes any firestop material.

Embodiment 23

The apparatus of any of embodiments 1-22 wherein the elongated open-ended sleeve further comprises at least one intumescent sheet that is abutted against a major inside surface of a sidewall of the elongated open-ended sleeve.

Embodiment 24

A method of firestopping a through-penetration in a wall, the method comprising mounting the apparatus of any of embodiments 1-23 in the through-penetration.

Embodiment 25

The method of embodiment 24, further comprising passing at least one elongate tube through the elongate length of the open-ended sleeve of the apparatus so that the elongate tube extends out of the first and second open ends of the open-ended sleeve.

It will be apparent to those skilled in the art that the specific exemplary structures, features, details, configurations, methods, etc., that are disclosed herein can be modified and/or combined in numerous embodiments. All such variations and combinations are contemplated by the inventor as being within the bounds of the conceived invention not merely those representative designs that were chosen to serve as exemplary illustrations. Thus, the scope of the present invention should not be limited to the specific illustrative structures described herein, but rather extends at least to the structures described by the language of the claims, and the equivalents of those structures. To the extent that there is a conflict or discrepancy between this specification as written and the disclosure in any document incorporated by reference herein, this specification as written will control.

What is claimed is:

1. A firestopping apparatus for mounting into a through-penetrating opening in a wall, comprising:
an elongated open-ended sleeve with a long axis, a transverse axis, and with first and second open ends, and which at least partially defines an interior space therein, which interior space allows passage of at least one elongate tube therethrough; and,
first and second airflow-blocking elements, each of the first and second airflow-blocking elements being positioned proximate the first open end of the sleeve and extending at least generally along the transverse axis of the sleeve so as to comprise a first transverse end that is proximate a first transverse sidewall of the sleeve and a second transverse end that is proximate a second transverse sidewall of the sleeve;

wherein at least the first airflow-blocking element comprises a resiliently compressible material that at least generally circumferentially surrounds, and is supported by, a support shaft that is connected to the sleeve by a biasing suspension that biases the first airflow-blocking element toward the second airflow-blocking element along a biasing axis.

2. The apparatus of claim 1 wherein each of the first and second airflow-blocking elements extends along the transverse axis of the sleeve so as to comprise a first transverse end that at least closely abuts a first transverse sidewall of the sleeve and a second transverse end that at least closely abuts a second transverse sidewall of the sleeve.

3. The apparatus of claim 1 wherein the biasing suspension is configured to allow the first airflow-blocking element to automatically move along its biasing axis in a direction away from the second airflow-blocking element, upon the impinging of at least one elongate tube onto a radially outermost surface of the first airflow-blocking element as the at least one elongate tube is passed through the first open end of the sleeve.

4. The apparatus of claim 1 wherein the support shaft of the first airflow-blocking element comprises a long axis that is oriented at least generally perpendicular to the biasing axis of the first airflow-blocking element and is at least generally aligned with the transverse axis of the sleeve.

5. The apparatus of claim 4 wherein the resiliently compressible material comprises a resiliently compressible cylindrical sleeve that resides radially outward of the support shaft and at least substantially circumferentially surrounds the support shaft, and that has a long axis that is at least generally aligned with the transverse axis of the elongated, open-ended sleeve.

6. The apparatus of claim 5 wherein at least a transversely-extending section of the resiliently compressible cylindrical sleeve is at least partially rotatable about a rotation axis that is aligned with a long axis of the support shaft.

7. The apparatus of claim 5 wherein the resiliently compressible cylindrical sleeve comprises a plurality of sections that are spaced generally along the transverse axis of the elongated, open-ended sleeve, each section of the resiliently compressible cylindrical sleeve extending generally along this transverse axis and being separated from a transversely adjacent section of the resiliently compressible cylindrical sleeve by a slit that extends from the radially outermost surface of the resiliently compressible cylindrical sleeve, radially inward through at least about 60% of a radial thickness of the resiliently compressible cylindrical sleeve at the location of the slit, and that extends entirely circumferentially around the resiliently compressible cylindrical sleeve.

8. The apparatus of claim 7 wherein each section of the plurality of sections of the resiliently compressible cylindrical sleeve is fully rotatable about a rotation axis that is aligned with the long axis of the support shaft, independently of any rotation of any other section.

9. The apparatus of claim 1 wherein at least a portion of the first airflow-blocking element protrudes outward along the long axis of the elongated, open-ended sleeve past the first open end of the elongated, open-ended sleeve, regardless of the position of the first airflow-blocking element along its biasing axis.

10. The apparatus of claim 1 wherein the apparatus further comprises at least one sealing plate with a first end portion that at least closely abuts the radially-outward surface of the resiliently compressible material of the first airflow-blocking element, with a second end portion that at least closely abuts a first primary sidewall of the sleeve; and with first and second transverse edges that respectively at least closely abut first and second transverse sidewalls of the elongated open-ended sleeve,
wherein the first end portion of the sealing plate remains at least closely abutted with the radially-outward surface of the resiliently compressible material regardless of the position of the first airflow-blocking element along its biasing axis, and regardless of any rotation of the resiliently compressible material about a rotation axis that is generally transverse to the biasing axis.

11. The apparatus of claim 10 wherein the sealing plate is provided by a first end section of the sidewall, which first end section of the sidewall is configured so that the first end portion of the sealing plate is provided by a first-end lip of the first primary sidewall of the sleeve.

12. The apparatus of claim 10 wherein the first end portion of the sealing plate is provided by a first end portion of a support member of the biasing suspension, which support member combines with a portion of the first primary sidewall to define a dead-end compartment that is located between the first primary sidewall and the interior space of the elongated open-ended sleeve that allows passage of the at least one elongate tube therethrough.

13. The apparatus of claim 12 wherein the second end portion of the support member is hingedly connected to a sidewall of the elongated open-ended sleeve, and wherein at least one compression spring is provided within the dead-end compartment and is configured to bias the first end portion of the support member away from the first primary sidewall of the elongated open-ended sleeve.

14. The apparatus of claim 12 wherein the second end portion of the support member is connected to a sidewall of the elongated open-ended sleeve, and wherein the support member is provided in the form of a leaf spring that is configured to bias the first end portion of the support member away from the first primary sidewall of the elongated open-ended sleeve.

15. The apparatus of claim 1 wherein the second airflow-blocking element comprises a resiliently compressible material that at least generally circumferentially surrounds, and is supported by, a second support shaft that is connected to the elongated, open-ended sleeve by a second biasing suspension that biases the second airflow-blocking element toward the first airflow-blocking element along a biasing axis of the second airflow-blocking element.

16. The apparatus of claim 15 wherein the first and second airflow-blocking elements are each hingedly connected to the elongated, open-ended sleeve and are co-biased toward each other by at least one co-biasing mechanism that serves to co-bias the first and the second airflow-blocking elements toward each other.

17. The apparatus of claim 1 further comprising third and fourth airflow-blocking elements, each of the third and fourth elements being positioned proximate the second open end of the elongated open-ended sleeve and extending at least generally along the transverse axis of the elongated open-ended sleeve so as to comprise a first transverse end that is proximate the first transverse sidewall of the elongated open-ended sleeve and a second transverse end that is proximate the second transverse sidewall of the elongated open-ended sleeve; and wherein at least the third airflow-blocking element comprises a resiliently compressible material that at least generally circumferentially surrounds, and is supported by, a support shaft that is connected to the elongated open-ended sleeve by a biasing suspension that biases the third airflow-blocking element toward the fourth airflow-blocking element along a biasing axis of the third airflow-blocking element.

18. The apparatus of claim 1 wherein upon passing an elongate tube through the first end of the elongated, open-ended sleeve so that the tube is in contact with a first transverse portion of the first airflow-blocking element and with a first transverse portion of the second airflow-blocking element, the radially outermost surface of a second transverse portion of the first airflow-blocking element at least closely abuts a radially outermost surface of a second transverse portion of the second airflow-blocking element.

19. The apparatus of claim 1 wherein the elongated open-ended sleeve is provided in the form of first and second elongated parts that are connected to each other by a hinged connection that is at least generally aligned with the long axis of the sleeve and that extends along at least a portion of the elongate length of the sleeve;

wherein the first and second elongated parts each comprise an edge, which edges of the first and second elongated parts are closely abuttable against each other; and, wherein the elongated open-ended sleeve comprises a clamshell design in which the first and second elongated parts can be hingedly rotated into an open configuration and can be hingedly rotated into a closed configuration in which the edges of the first and second elongated sleeve parts are at least closely abutted against each other.

20. The apparatus of claim 1 wherein the elongated open-ended sleeve is provided in the form of first and second elongated pieces that are separable from each other and that are mateable to each other to form the sleeve.

21. The apparatus of claim 1 wherein no airflow-blocking element of the apparatus includes any firestop material.

22. The apparatus of claim 21 wherein the elongated open-ended sleeve further comprises at least one intumescent sheet that is abutted against a major inside surface of a sidewall of the elongated open-ended sleeve.

\* \* \* \* \*